United States Patent [19]
Chen et al.

[11] Patent Number: 5,817,927
[45] Date of Patent: Oct. 6, 1998

[54] METHOD AND APPARATUS FOR MONITORING WATER PROCESS EQUIPMENT

[75] Inventors: Haiwen Chen, Bethlemen, Pa.; Ke Hong, Kendall Park, N.J.

[73] Assignee: BetzDearborn Inc., Trevose, Pa.

[21] Appl. No.: 837,062

[22] Filed: Apr. 11, 1997

[51] Int. Cl.$^6$ .......................... G01M 3/04; G01M 21/00
[52] U.S. Cl. ............................... 73/40.7; 422/62
[58] Field of Search ........................ 73/40, 40.7, 40.5 R, 73/49.2 T, 53.01; 422/62, 50

[56] References Cited

U.S. PATENT DOCUMENTS

| | | | |
|---|---|---|---|
| 3,447,895 | 6/1969 | Nelson et al. | 23/48 |
| 4,462,319 | 7/1984 | Larsen | 110/238 |
| 4,498,333 | 2/1985 | Parthasarathy | 73/40.5 A |
| 4,502,322 | 3/1985 | Tero | 73/40.5 A |
| 4,783,314 | 11/1988 | Hoots et al. | 422/3 |
| 4,788,848 | 12/1988 | Hsueh | 73/29.01 |
| 4,852,053 | 7/1989 | Turrie | 364/151 |
| 4,966,711 | 10/1990 | Hoots et al. | 210/697 |
| 5,041,386 | 8/1991 | Pierce et al. | 436/50 |
| 5,304,800 | 4/1994 | Hoots et al. | 250/302 |
| 5,320,967 | 6/1994 | Avallone et al. | 436/50 |
| 5,363,693 | 11/1994 | Nevruz | 73/40.5 R |
| 5,411,889 | 5/1995 | Hoots et al. | 436/6 |
| 5,416,323 | 5/1995 | Hoots et al. | 250/302 |
| 5,435,969 | 7/1995 | Hoots et al. | 422/14 |
| 5,565,619 | 10/1996 | Thungstrom et al. | 73/40.7 |
| 5,663,489 | 9/1997 | Thungstrom et al. | 73/40.7 |
| 5,696,696 | 12/1997 | Gunther et al. | 364/500 |

OTHER PUBLICATIONS

"Black Liquor Recovery Boiler Advisory Committee Recommended Emergency Shutdown Procedure (ESP) and Procedure for Testing ESP System for Black Liquor Recovery Boilers", BLRBAC, Oct. 1993.

Buckner et al., "Design and Implementation of a Commercial Acoustic Leak–Detection System for Black Liquor Recovery Boilers", TAPPI Journal, 121, Jul., 1990.

Boyette et al., "An Automated Coordinated Phosphate/pH Controller for Industrial Boilers", Presented at NACE Corrosion '95, Mar., 1995.

Durham et al., "Black Liquor Recovery Boiler Leak Detection: Indication of Boiler Water Loss Using a Waterside Mass Balance Method", Presented at TAPPI '95, in Sep. 1995.

Clevett, K. J. Process Analyzer Technology, John Wiley & Sons, New York, 1986, 872–876.

Grace, T. M., "Acoustic Leak Detection—One Answer to a Need", PIMA, 53, Dec., 1988.

Racine et al., "An Expert System for Detecting Leaks in Recovery—Boiler Tubes", TAPPI Journal, 147, Jun., 1992.

*Primary Examiner*—Hezron E. Williams
*Assistant Examiner*—Jay L. Politzer
*Attorney, Agent, or Firm*—Alexander D. Ricci; Philip H. Von Neida

[57] ABSTRACT

Methods and apparatus are provided for detection of leaks in boilers containing a temperature control liquid which is supplemented with feedwater and removed as blowdown and steam. The methods include measuring rates associated with the feedwater supplementation and blowdown and steam removal means, adding a tracer in a manner to ensure a non-constant concentration in the temperature control liquid, determining the concentration of the tracer in the blowdown, calculating the mass of the temperature control liquid, calculating the unaccounted for water rate and comparing this rate with zero to determine if a leak condition is present.

21 Claims, 1 Drawing Sheet

METHOD AND APPARATUS FOR MONITORING WATER PROCESS EQUIPMENT

FIELD OF THE INVENTION

The present invention is directed to methods and apparatus for monitoring industrial water process equipment. More particularly, the invention is directed to the detection of leaks in water process equipment such as black liquor recovery boilers.

BACKGROUND OF THE INVENTION

A boiler is an apparatus in which water or some other aqueous temperature control liquid to which makeup water is added and from which blowdown is removed is vaporized into steam by the application of heat from a furnace or heat-generating process system. In most instances, the temperature control liquid is brought into close, indirect contact with the process system to facilitate heat transfer. Leakage in a boiler can result not only in contamination and fouling of the temperature control liquid and the process system, but also in undesired physical reactions. This is particularly true for the black liquor recovery boilers used in many paper mills. In black liquor recovery boilers, the escape or leakage of aqueous temperature control liquid from the so-called "water side" of the boiler into the hot, highly caustic "fire side" can result in violent explosions.

The prior art provides numerous techniques for monitoring and controlling leaks in black liquor recovery boilers and other boiler systems. For example, U.S. Pat. No. 5,320,967 (Avallone, et al.) discloses a boiler system leak detection method that involves introducing an inert tracer to the boiler in a known and uniform proportion to the feedwater, sensing a characteristic of the tracer in the boiler at steady state, converting the sensed characteristic to a value equivalent to the concentration of the tracer in the temperature control liquid, and activating a signal when there is excessive variance in the concentration of the tracer. However, the method disclosed by Avallone, et al. is limited by its requirement that the tracer be detected (sensed) when the boiler is at steady state, which is said to occur only when there is no significant change in any of five process parameters: the concentration of the tracer in the boiler; the blowdown rate; the feedwater rate; the rate of feeding tracer to the boiler; and the steaming rate in the absence of boiler leakage.

U.S. Pat. No. 5,363,693, Nevruz, teaches methods and apparatus for detecting leakage from recovery boiler systems. The methods utilize measuring the mass input and output of a recovery boiler and calculating the long and short term statistics for the drum balance of mass flow. From these calculations a t-test function is calculated to see if both long term and short term moving average of drum balances are significantly different, which in turn indicates whether a boiler leak is occurring. Although this method provides corrections to sensor input caused by flow sensor drift and offset, it still suffers from serious offsets in the leak detection signal during changes in process parameters, namely steaming rate changes.

U.S. Pat. No. 5,565,619, Thungstrom et al. teaches methods and apparatus for monitoring boilers for leaks. These methods assume that boiler water mass is constant. The methods utilize a tracer compound which is added to the boiler water at a rate that is proportional to the blowdown water rate. The expected concentration of the tracer exiting the boiler is calculated utilizing non-equilibrium condition variables and compared to the actual concentration of tracer in the blowdown. If there is a statistically significant difference between actual and expected concentrations, a leak condition is indicated.

Consequently, there remains a need in the art for a leak detection system which can be employed in boilers that are not at a steady rate (i.e. experience load swings). Further, there is a need for a leak detection system that does not assume that boiler water mass is constant and can operate with or without an automatic water level controller.

SUMMARY OF THE INVENTION

The present invention provides for methods and apparatus for the detection of leaks in boilers to which a temperature control liquid is added and from which liquid is removed. The temperature control liquid is supplemented with feedwater removed as blowdown, main steam and sootblower steam. These rates of supplementation and removal are measured. In a preferred embodiment, a tracer chemical is added to the temperature control liquid, and its mass is measured, upon addition to and its concentration upon removal from the boiler.

By varying the tracer chemical input rate to obtain a situation where the rate of the tracer chemical being added is different from the rate of the same tracer chemical exiting the boiler, the water mass contained in the boiler can be calculated. From this calculation, the unaccounted for water rate (i.e., leak) can be determined utilizing either of a water mass balance equation or a chemical mass balance equation.

BRIEF DESCRIPTION OF THE DRAWING

The accompanying

DETAILED DESCRIPTION OF THE INVENTION

Figure 1:
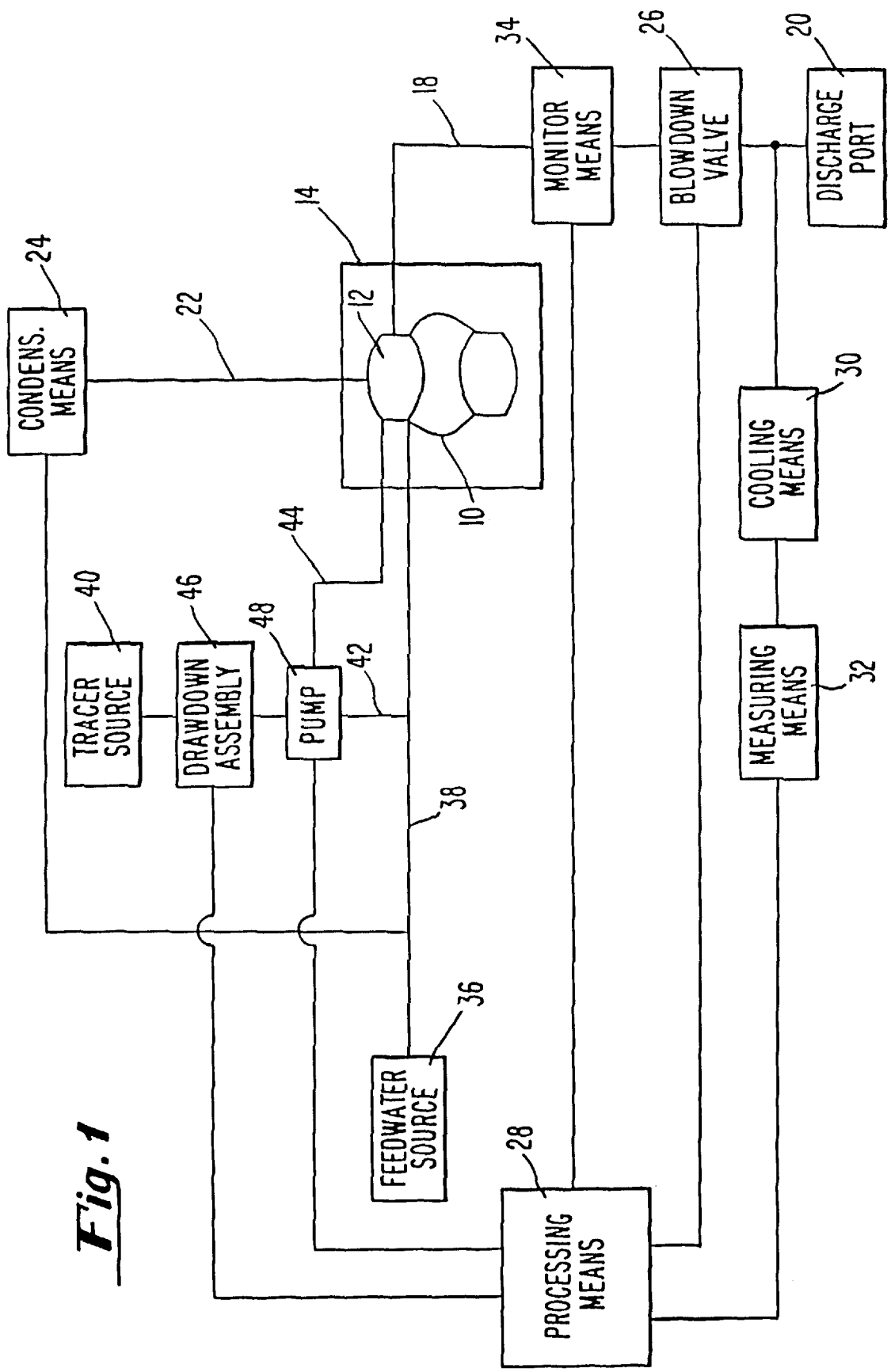
FIG. 1 is a schematic representation of a boiler monitoring system according to the invention.

The present invention provides for methods and apparatus for detecting a leak in a boiler in which a temperature control liquid in a liquid containment means is supplemented with feedwater and is removed as blowdown, main steam, and sootblower steam comprising the steps of:

a) Measuring a rate associated with said feedwater supplementation to obtain data;

b) Measuring a rate associated with said blowdown and said steam removal to obtain data;

c) Adding at a measured rate a tracer to said temperature control liquid in a manner so that the concentration of said tracer is not constant in said temperature control liquid;

d) Determining the concentration of said tracer in said blowdown;

e) Calculating the mass of said temperature control liquid from the data obtained in steps (a) and (b), the addition rate of said tracer in said temperature control liquid, and the concentration of tracer obtained in step (d);

f) Calculating the unaccounted for water rate from the data obtained in steps (a) and (b) and the mass of said temperature control liquid obtained in step (e);

g) Comparing said unaccounted for water rate with zero; and h) Indicating a leak condition if said unaccounted for water rate is greater than zero.

The present invention also provides for apparatus for detecting leaks in boiler systems. The apparatus according to the present invention comprises: Measuring means in communication with feedwater supplementation means; measuring means in communication with blowdown and steam removal means; tracer addition means in communication with liquid containment means; concentration determination means in communication with blowdown removal means; mass derivation means in communication with the rate measuring means, the tracer addition means and the concentration determination means; derivation means in communication with said mass derivation means for deriving the unaccounted for water rate; comparison means in communication with the unaccounted for water rate derivation means to determine if a leak condition exists.

The methods and apparatus of the present invention can be used to monitor virtually any type of equipment to which liquid is added and from which liquid is removed. The methods and apparatus of the invention preferably are used to monitor boilers, especially black liquor recovery boilers. Representative boilers are disclosed by U.S. Pat. Nos. 3,447,895 (Nelson, et al.), 4,462,319 (Larson), 4,498,333 (Parthasarathy), and 4,502,322 (Tero), the contents of which are incorporated herein by reference.

An exemplary monitoring system according to the invention is shown in FIG. 1, wherein a first ("water side") containment means or "boiler" 10 containing temperature control liquid 12 is adjacent to and in thermal communication with a second ("fire side") containment means 14 that typically contains hot vapors and a molten smelt bed. Boiler 10 is in fluid communication with blowdown line 18 for the discharge of blowdown to discharge port 20 and with steam line 22 for the discharge of steam to condensation means 24. The discharge of blowdown is controlled through actuation of blowdown valve 26, which can be operated manually or under the control of an external computer or some other processing means (not shown). It is not necessary that the blowdown valve be under control of the system of the invention. Between boiler 10 and valve 26, blowdown line 18 is in fluid communication with monitoring means 34 to provide information on the blowdown flow rate. Downstream of valve 26, part of the blowdown flow is diverted to cooling means 30 for sampling and analysis. Measuring means 32, such as an on-line analyzer based upon UV/visible spectroscopy, is downstream of cooling means 30 to provide means for determining the concentration of tracer in the blowdown. Measuring means 32 and 34, in turn, are in electrical communication with processing means 28.

Blowdown flow monitor 34 can use any number of flowmeters designed for high temperature liquid use including orifice plate meters, vortex-shedding meters, flow nozzle meters, venturi meters, strain gauge meters, doppler (transit time) meters, turbine meters, mag meters, and pito-type devices. Cooling means 30 can be any number of sample coolers with sufficient cooling water flowing through it to lower the sample water temperature to ambient. The selected measuring means 32 depends on the tracer being used. For example, with a molybdate tracer a FPA 800 analyzer manufactured by Tytronics (Waltham, Mass.) can be used. Alternatively, if a phosphate is used as a combined tracer and treatment chemical, a Hach (Loveland, Colo.) Series 5000 phosphate analyzer can be used.

Boiler 10 also is in fluid communication with feedwater source 36 via feed line 38. As shown in FIG. 1, feed line 38 is in fluid communication with tracer source 40 via chemical feed line 42. Alternatively, tracer source 40 is directly coupled with boiler 10 via chemical feed 44. In either embodiment, the absolute amount of tracer added to boiler 10 is controlled and recorded by processing means 28.

Tracer source 40 can contain tracer or a mixture of tracer and other treatment chemicals to be fed to the boiler. Downstream of tracer source 40, a flow measurement apparatus ("drawdown assembly") 46 provides a precise measurement and control of tracer flow being injected into the feedwater line 38 via an electrically driven pump 48. Both drawdown assembly 46 and pump 48 are in electrical communication with processing means 28. Drawdown assembly 46 provides a feedback signal to processing means 28 which, in turn, controls the pumping rate of pump 48 to ensure a verified feed of chemicals to feed lines 42 or 44. Processing means 28 and associated drawdown assembly 46 preferably are constructed in accordance with the teachings of U.S. Pat. No. 4,897,797, assigned to the same assignee as this invention and incorporated by reference herein.

During normal operation, the controlled addition of feedwater to boiler 10 compensates for the removal of blowdown and steam, and maintains a desired volume of temperature control liquid 12 within boiler 10. In accordance with the present invention, the temperature control liquid is further supplemented with a known amount of at least one tracer. Tracers according to the invention are organic and/or inorganic compounds that are soluble in the feedwater, temperature control liquid, and blowdown under the operating conditions encountered. Tracers also should be thermally stable and non-volatile. In certain embodiments, the selected tracer is a reactive chemical treatment added to the boiler to, for example, control corrosion or the deposition of scale. In other embodiments, the tracer is substantially nonreactive with (i.e., inert to) the feedwater, temperature control liquid, blowdown, and contacted surfaces of the process equipment. It is preferred that the feedwater introduced to the process equipment upstream of tracer injection be substantially free of tracer, i.e., that it contain less than about 0.002 ppm of the tracer and/or that it have a tracer concentration less than about one percent of the tracer concentration of the temperature control liquid.

Tracers according to the invention possess at least one physical property that permits their detection in samples of the blowdown. Preferred tracers absorb and/or emit measurable amounts of light (or form reaction products that absorb and/or emit measurable amounts of light) in proportion to the amount of tracer present. Tracers preferably are detectable by at least one analytical technique selected from electrochemistry, UV/visible spectrophotometry, or fluorescence emission spectroscopy. Representative tracers include the tracers disclosed in U.S. Pat. Nos. 4,783,314 (Hoots, et al.), 4,966,711 (Hoots, et al.), 5,041,386 (Pierce, et al.), 5,200,106 (Hoots, et al.), 5,304,800 (Hoots, et al.), and 5,320,967 (Avallone, et al.), the contents of which are incorporated herein by reference. Preferred tracers are sodium-, lithium-, and phosphate-containing chemical treatment and transition metal compounds, including salts, ions, oxy-anions, cations, and complexes of metals belonging to Group VIII of the Periodic Table. Particularly preferred are molybdenum-containing compounds, including molybdenum salts such as sodium molybdate.

Tracers can be added to the temperature control liquid in any number of ways. For example, tracer-containing solutions can be added directly to the temperature control liquid, they can be pre-mixed with feedwater that is added to the temperature control liquid, or they can be pre-mixed with treatment chemicals and then added to the feedwater. The particular addition technique is not believed to be critical, so long as the tracer is added to the temperature control liquid at a non constant rate. In general, the amount of added tracer should be sufficient to establish a tracer concentration of from about 0.2 to about 20 ppm in the temperature control liquid and, hence, in the blowdown.

A natural consequence of steam generation in a boiler is a concentrating of incoming, non-volatile components. To control this "cycling up" effect, one or more volumes of the relatively-concentrated temperature control liquid typically are removed from the boiler as blowdown and corresponding volumes of relatively-dilute feedwater as added. In accordance with the present invention, the blowdown either is sampled at regular or irregular known intervals or is continuously monitored to determine the measured concentration of tracer contained therein. This determination can be made, for example, by directly or indirectly comparing the amount of light absorbed or emitted by the blowdown with the amount of light absorbed or emitted by standard solutions containing known concentrations of the tracer and other solutes found in the blowdown. Alternatively, the blowdown is mixed with a reagent that reacts with the tracer and imparts a color to the blowdown in proportion to its tracer concentration. The tracer concentration can be determined by comparing the color with the color of one or more standard solutions prepared by mixing solutions containing known concentrations of the tracer with the reagent.

The methods of the present invention further involve deriving the water mass contained in the boiler. In one manner, the input rate of temperature control liquid as feedwater and the output rate of temperature control liquid as blowdown and steam can be measured either intermittently or continuously. The water mass balance equation has the form:

$$\frac{dM}{dt} = I - O - U \quad (1)$$

where M=Mass of water contained

I=Water input rate

O=Water output rate

U=Unaccounted for water rate t=Time

In another manner, the water mass contained in the boiler can be derived through the chemical mass balance equation. This equation has the form:

$$\frac{d(M \times C_1)}{dt} = I_c - O_c - U \times C_2 \quad (2)$$

Where $C_1$=Chemical concentration in water contained $C_2$=Chemical concentration in unaccounted water input or output $I_c$=Chemical Mass input rate $O_c$=Chemical Mass output rate For both these equations, M and U are not measured. Solving for M will allow then to solve for U. Multiplying equation (1) by ($-C_2$) and adding the result to equation (2) yields:

$$\frac{d(M \times C_1)}{dt} - C_2 \times \frac{dM}{dt} = I_c - O_c - (I - O) \times C_2$$

or $$(C_1 - C_2) \times \frac{dM}{dt} + M \times \frac{dC_1}{dt} = I_c - O_c - (I - O) \times C_2 \quad (3)$$

This equation is a first order differential equation for M if $C_1$ does not equal $C_2$ and can be solved for M.

However, there is often the situation where the chemical concentration in the contained water ($C_1$) equals the chemical concentration in the unaccounted for water input or output ($C_2$). This demonstrates the need for $C_1$ to be non-constant. By intentionally making the concentration of the tracer chemical in the boiler water fluctuate, the water mass can be calculated, thus eliminating the estimation of mass requirement in the prior art.

The concentration change of the tracer chemical should be continuous and can be caused to fluctuate through a shot feed of tracer chemical or a pulsed or metered feed of tracer chemical. A result of non-constant chemical tracer concentration in the boiler is greater sensitivity towards leaks. In one aspect of the present invention, it is generally advantageous to hold treatment (scale, corrosion control, etc.) chemical concentrations constant. It is then advantageous to use an independent, inert tracer chemical whose concentration can be fluctuated without physical consequence to the system under study.

As such, by fluctuating the chemical concentration of the tracer chemical in the containment water, particularly when $C_1 = C_2$, we arrive at the equation:

$$M = \frac{I_c - O_c - (I - O) \times C_1}{dC_1/dt} \quad (4)$$

Having calculated for the mass of the containment water (M), this value can then be substituted into either equation (1) or (2) and solved for the unaccounted for water rate, U. Comparing this value for U with zero will indicate whether a leak condition is present or not. Thus, if U is a positive number, then the boiler operator initiates an investigation into the possible causes. This typically involves physical and/or acoustical examination of the boiler and, depending on the magnitude of the variance, complete shutdown of the boiler.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for detecting a leak in a boiler in which a temperature control liquid in a liquid containment means is supplemented with feedwater and is removed as blowdown, main steam, and sootblower steam comprising the steps of:

a) Measuring a rate associated with said feedwater supplementation to obtain data;

b) Measuring a rate associated with said blowdown and said steam removal to obtain data;

c) Adding at a measured rate a tracer to said temperature control liquid in a manner so that the concentration of said tracer is not constant in said temperature control liquid;

d) Determining the concentration of said tracer in said blowdown;

e) Calculating the mass of said temperature control liquid from the data obtained in steps (a) and (b), the addition rate of said tracer in said temperature control liquid, and the concentration of tracer obtained in step (d);

f) Calculating the unaccounted for water rate from the data obtained in steps (a) and (b) and the mass of said temperature control liquid obtained in step (e);

g) Comparing said unaccounted for water rate with zero; and h) Indicating a leak condition if said unaccounted for water rate is greater than zero.

2. The method as claimed in claim 1 where said rate in steps (a) and (b) is in weight per time unit.

3. The method as claimed in claim 1 where said measurement in steps (a) and (b) are by flow meters.

4. The method as claimed in claim 1 wherein said determination in step (d) is made by an analyzer.

5. The method as claimed in claim 1 wherein said calculations in steps (e) and (f) are made by a computer.

6. The method as claimed in claim 1 wherein said comparison in step (g) is made by a computer.

7. The method as claimed in claim 1 wherein said boiler is a black liquor recovery boiler.

8. The method as claimed in claim 1 wherein said tracer is a transition metal compound.

9. The method as claimed in claim 8 wherein said tracer is a molybdenum-containing compound.

10. The method as claimed in claim 9 wherein said tracer is a molybdenum salt.

11. The method as claimed in claim 10 wherein said tracer is sodium molybdate.

12. The method as claimed in claim 1 wherein said tracer is a lithium-, or phosphate-containing chemical treatment.

13. The method as claimed in claim 1 wherein the determination of mass of said temperature control liquid is derived according to the formula:

$$M = \frac{I_c - O_c - (I - O) \times C_1}{dC_1/dt}$$

where:
M=Mass of temperature control liquid
$I_c$=Chemical mass input rate
$O_c$=Chemical Mass output rate
I=Water input rate
O=Water output rate
$C_1$=Chemical concentration in temperature control liquid
t=Time.

14. The method as claimed in claim 1 wherein the unaccounted for water rate is derived according to the formula:

$$\frac{dM}{dt} = I - O - U$$

where:
M=Temperature control liquid mass
I=Water input rate
O=Water output rate
U=Unaccounted for water rate; and
t=Time.

15. The method as claimed in claim 1 further comprising physically analyzing said boiler in response to a positive difference between said unaccounted for water rate and zero.

16. A system for detecting a leak in a boiler in which a temperature control liquid in a containment means is supplemented with feedwater and is removed as blowdown, main steam, and sootblower steam, said system comprising:

Measuring means in communication with said supplementation for measuring the rate associated with said feedwater supplementation;

Measuring means in communication with said containment means for monitoring a rate associated with said blowdown and said steam removal;

Addition means in communication with said containment means for adding a tracer to said containment means in a manner so that the concentration of said tracer in said containment means is not constant;

Determination means in communication with said containment means for deriving the concentration of said tracer in said blowdown;

Determination means in communication with said supplementation rate measuring means, said blowdown and said steam rate measuring means, said tracer addition means, and said determination means for deriving the mass of said temperature control liquid;

Derivation means in communication with said supplementation rate measuring means, said blowdown and said steam rate measuring means and said mass derivation means for determining the unaccounted for water rate;

Comparison means in communication with said unaccounted for water rate determination means for comparing said unaccounted for water rate determination with zero.

17. The system as claimed in claim 16 wherein said addition means comprises a tracer source coupled with a flow measurement apparatus and a feed line.

18. The system as claimed in claim 16 wherein said mass determination means comprises processing means coupled with said supplementation and said removal measuring means.

19. The system as claimed in claim 16 wherein said unaccounted for water rate determination means comprises processing means coupled with said supplementation and removal rate measuring means, said tracer addition means and said mass determination means.

20. The system as claimed in claim 16 wherein said mass determination means and said unaccounted for water rate determination means are computers.

21. The system as claimed in claim 16 wherein said blowdown tracer concentration means are analyzers.

* * * * *